United States Patent
Nishihara

(10) Patent No.: US 7,491,771 B2
(45) Date of Patent: Feb. 17, 2009

(54) OLEFINIC RUBBER COMPOSITION

(75) Inventor: Hajime Nishihara, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 414 days.

(21) Appl. No.: 11/425,935

(22) Filed: Jun. 22, 2006

(65) Prior Publication Data

US 2006/0235155 A1 Oct. 19, 2006

Related U.S. Application Data

(62) Division of application No. 09/958,233, filed as application No. PCT/JP00/01140 on Feb. 28, 2000.

(30) Foreign Application Priority Data

Aug. 31, 1998 (JP) ................................. 10-244607

(51) Int. Cl.
    C08L 23/00 (2006.01)
(52) U.S. Cl. ........................ 525/191; 525/222; 525/232; 525/240
(58) Field of Classification Search ................. 525/191, 525/222, 232, 240
See application file for complete search history.

(56) References Cited

U.S. PATENT DOCUMENTS

| | | | |
|---|---|---|---|
| 3,299,183 A | 1/1967 | Borghese | |
| 4,026,966 A | 5/1977 | Baldwin et al. | |
| 5,539,052 A * | 7/1996 | Shieh et al. | ................ 525/92 R |
| 5,677,382 A | 10/1997 | Tsuji et al. | |
| 6,087,431 A | 7/2000 | Uchida et al. | |
| 6,384,143 B1 | 5/2002 | Nishihara et al. | |
| 6,399,671 B1 | 6/2002 | Hoch et al. | |

FOREIGN PATENT DOCUMENTS

| | | |
|---|---|---|
| EP | 0838497 | 4/1998 |
| JP | 4-258639 | 9/1992 |
| JP | 7-138378 | 5/1995 |
| JP | 8-120127 | 5/1996 |
| JP | 9-77932 | 3/1997 |
| JP | 9-104787 | 4/1997 |
| JP | 9-137001 | 5/1997 |
| JP | 10-87912 | 4/1998 |
| JP | 10-287776 | 10/1998 |

* cited by examiner

*Primary Examiner*—Thao T. Tran
(74) *Attorney, Agent, or Firm*—Birch, Stewart, Kolasch & Birch, LLP

(57) ABSTRACT

A process for producing a partially or completely crosslinked olefinic rubber composition which comprises (A) 1 to 99 parts by weight of an ethylene-α-olefin copolymer having ethylene units and $C_3$-$C_{20}$ α-olefin units, and (B) 1 to 99 parts by weight of an olefinic resin, total amount of (A) and (B) being 100 parts by weight, said (A) having a degree of crosslinking of 50% or more and a degree of swelling of 5 to 40.

9 Claims, No Drawings

OLEFINIC RUBBER COMPOSITION

This application is a Divisional of co-pending application Ser. No. 09/958,233 filed on Oct. 5, 2001 and for which priority is claimed under 35 U.S.C. § 120. application Ser. No. 09/958,233 is the national phase of PCT International Application No. PCT/JP00/01140 filed on Feb. 28, 2000 under 35 U.S.C. § 371. The entire contents of each of the above-identified applications are hereby incorporated by reference.

TECHNICAL FIELD

The present invention relates to an olefinic rubber composition. More particularly, it relates to an olefinic rubber composition with improved mechanical strength, heat resistance and oil resistance.

BACKGROUND ART

Preparation of thermoplastic rubber compositions by use of so-called dynamic crosslinking reaction, in which a radical-crosslinkable olefinic rubber and a non-radical-crosslinkable olefinic resin such as polypropylene (PP) are crosslinked in the presence of a radical polymerization initiator while being melted and mixed in an extruder, is a technique already known in the art and widely used for the manufacture of automobile parts, etc.

As said type of olefinic rubber, there are known ethylene-propylene-diene rubber (EPDM) compositions and olefinic elastomer compositions produced by using a metallocene catalyst (JP-A-8-120127, JP-A-9-137001, JP-A-9-104787 and JP-A-10-87912). These known compositions, however, are not necessarily satisfactory in mechanical strength, and quest has been made for the olefinic rubber compositions which can stand practical use.

DISCLOSURE OF THE INVENTION

In view of the above, the present invention is designed to provide an olefinic rubber composition which is free of the above-mentioned problem, i.e. improved in mechanical properties.

The quest by the present inventors for an olefinic rubber composition with high mechanical strength has led to the finding that quite surprisingly an olefinic rubber composition containing ethylene and an α-olefin and having a specific crosslinked structure is drastically improved in mechanical strength, and this finding underlies the present invention.

Thus, the present invention provides a partially or completely crosslinked olefinic rubber composition which comprises (A) 1 to 99 parts by weight of an ethylene-α-olefin copolymer containing ethylene and $C_3$-$C_{20}$ α-olefin units, and (B) 1 to 99 parts by weight of an olefinic resin, total amount of (A) and (B) being 100 parts by weight, said (A) having a degree of crosslinking of 50% or more and a degree of swelling of 5 to 40.

BEST MODE FOR CARRYING OUT THE INVENTION

A detailed description of the present invention follows.

The composition of the present invention comprises (A) an ethylene-α-olefin copolymer having a specific crosslinked structure and (B) an olefinic resin.

It is important that (A) has a degree of crosslinking of 50% or more, preferably 60% or more, more preferably 70% or more, most preferably 80% or more, especially preferably 90% or more. If the degree of crosslinking of (A) is less than 50%, the composition proves low in mechanical strength (tensile strength, compression set, etc.), oil resistance and heat resistance.

It is also essential that (A) has a degree of swelling of 5 to 40, preferably 10 to 35, more preferably 10 to 30, most preferably 10 to 25, especially preferably 10 to 20. The degree of swelling is an index of the degree of crosslinking density. The conventional olefinic rubbers were less than 5 in degree of swelling, but the present inventors found that excellent mechanical properties, heat resistance and oil resistance are realized only when the degree of swelling stays between 5 and 40, and achieved the present invention on the basis of this finding.

The components of the composition of the present invention are described in detail below.

In the present invention, the ethylene-α-olefin copolymer (A), for instance, consists of ethylene units and $C_3$-$C_{20}$ α-olefin units.

Examples of said $C_3$-$C_{20}$ α-olefins include propylene, butene-1, pentene-1, hexene-1,4-methylpentene-1, heptene-1, octene-1, nonene-1, decene-1, undecene-1 and dodecene-1. Of these olefins, hexene-1,4-methylpentene-1 and octene-1 are preferred. Octene-1 is especially preferred. Octene-1 exhibits its excellent effect in softening the copolymer by the addition of a small quantity, and the produced copolymer has high mechanical strength.

The ethylene-α-olefin copolymer used in the present invention is preferably produced by using a known metallocene or Ziegler type catalyst.

Generally, the metallocene type catalysts consist of a cyclopentadienyl derivative of a Group IV metal such as titanium or zirconium and a co-catalyst, and they not only show a high activity in use as a polymerization catalyst but also provide a polymer with narrower molecular weight distribution and a more uniform distribution of the $C_3$-$C_{20}$ α-olefin, which is a comonomer in the copolymer, than provided by the Ziegler type catalysts.

In the ethylene-α-olefin copolymer used in the present invention, the copolymerization ratio of the α-olefin is preferably 1 to 50% by weight, more preferably 10 to 40% by weight, most preferably 20 to 30% by weight. When the copolymerization ratio of the α-olefin exceeds 50% by weight, the produced composition greatly lowers in hardness and tensile strength. When the ratio is less than 1% by weight, the composition becomes high in hardness and tends to lower in mechanical strength.

The density of (A) preferably falls within a range of 0.8 to 0.9 g/cm³. Use of an ethylene-α-olefin copolymer having a density in the above range provides a thermoplastic resin composition with excellent flexibility and a low hardness.

The ethylene-α-olefin copolymer (A) used in the present invention preferably has long-chain branches of the molecule. The presence of long-chain branches of the molecule makes it possible to lessen the density in comparison with the ratio (wt %) of the copolymerized α-olefin without reducing mechanical strength, allowing obtainment of a low-density, low-hardness and high-strength rubber. The olefinic rubbers having long-chain branches of the molecule are shown in U.S. Pat. No. 5,278,272, etc.

Also, the ethylene-α-olefin copolymer (A) preferably has a peak melting point at room temperature or above. When the copolymer has a peak melting point, it is morphologically stabilized in the temperature range below the melting point and has good handling qualities and reduced tackiness.

The melt index of (A) used in the present invention is preferably in a range of 0.01 to 100 g/10 min (measured at 190° C. under a load of 2.16 kg), more preferably 0.2 to 10 g/10 min.

In the present invention, (A) has ethylene units and α-olefin units as essential components and where necessary may further contain other vinyl monomeric units. It is the only essential requirement for (A) to have ethylene units and α-olefin units, so that, for example, those copolymers which are produced by hydrogenating polystyrene-based, polyolefin-based, polyester-based, polyurethane-based, 1,2-polybutadiene-based or polyvinyl chloride-based thermoplastic elastomers and finally contain the ethylene units and α-olefin units in the structure are comprehended in (A).

As (A) in the present invention, it is possible to use plural types in admixture. In this case, further improvement of workability is possible.

As the olefinic resin (B) in the present invention, there can be used, for example, polyethylenes, isotactic homopolypropylenes, and isotactic (block and random) copolymers of propylene and other α-olefins such as ethylene, butene-1, pentene-1, hexene-1, etc.

At least one of these resins is used in a ratio of 1 to 99 parts by weight, preferably 5 to 90 parts by weight, more preferably 20 to 80 parts by weight, to 100 parts by weight of (A) and (B) combined. When the ratio of (B) is less than 1 part by weight, the obtained composition proves unsatisfactory in fluidity and workability, and when its ratio exceeds 99 parts by weight, the composition lacks flexibility.

The melt index of the olefinic resin used in the present invention preferably falls within the range of 0.1 to 100 g/10 min (measured at 230° C. under a load of 2.16 kg). When it exceeds 100 g/10 min, the produced thermoplastic elastomer composition is unsatisfactory in heat resistance and mechanical strength, and when the melt index is less than 0.1 g/10 min, the composition is bad in fluidity and deteriorates in molding workability.

In the composition of the present invention, a softening agent (C) may be blended as required for improving workability.

As the softening agent (C), process oils such as paraffinic and naphthenic are preferably used. Such a softening agent is used in an amount of 5 to 500 parts by weight, preferably 10 to 150 parts by weight for the adjustment of hardness and flexibility of the composition. When the amount of the softening agent is less than 5 parts by weight, the composition lacks in flexibility and workability, while use of the softening agent in excess of 500 parts by weight may cause excessive bleeding of the oil.

With a specific ethylene-α-olefin copolymer (A), an olefinic resin (B) and a softening agent (C) mentioned above being combined at a specific ratio, the composition of the present invention is improved in the balance of mechanical strength and other properties such as flexibility and workability and can be used advantageously for producing the desired articles.

The composition provided in the present invention needs to be partly crosslinked by a crosslinking initiator (D) or (D) and a crosslinking assistant (E). Such crosslinkage contributes to the further improvement of the properties such as wear resistance, mechanical strength and heat resistance of the composition.

The crosslinking initiator (D) is a phenolic crosslinking agent or a radical forming agent for effecting dynamic crosslinkage of (A), for which, for example, organic peroxides and organic azo compounds are preferably used. Use of (D) is conducive to the improvement of the properties such as wear resistance, mechanical strength and heat resistance of the composition.

The organic peroxides that can be favorably used for the above purpose are those whose one-minute half-life temperature $T_1$ is preferably 100 to 250° C., more preferably 150 to 200° C. It is also preferable that their crosslinking efficiency ε calculated from their hydrogen extractability from pentadecane molecule is 20 to 60, more preferably 30 to 50.

Examples of these radical initiators include peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)-cyclohexane, 1,1-bis(t-butylperoxy)cyclododecane, 1,1-bis(t-butylperoxy)cyclohexane, 2,2-bis(t-butylperoxy)-octane, n-butyl-4,4-bis(t-butylperoxy)butane and n-butyl-4,4-bis(t-butylperoxy) valerate; dialkylperoxides such as di-t-butyl peroxide, dicumyl peroxide, t-butylcumyl peroxide, α,α'-bis(t-butylperoxy-m-isopropyl)benzene, α,α'-bis(t-butylperoxy)-diisopropylbenzene, 2,5-dimethyl-2,5-bis(t-butylperoxy)hexane and 2,5-dimethyl-2,5-bis(t-butylperoxy)hexyne-3; diacylperoxides such as acetyl peroxide, isobutylyl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butyl peroxyacetate, t-butyl peroxyisobutylate, t-butylperoxy-2-ethyl hexaonate, t-butyl peroxylaurate, t-butyl peroxybenzoate, di-t-butyl peroxyisophthalate, 2,5-dimethyl-2,5-di(benzoylperoxy)hexane, t-butylperoxymaleic acid, t-butyl peroxyisopropylcarbonate, and cumyl peroxyoctate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide.

Among these compounds, 1,1-bis(t-butylperoxy)-3,3,5-trimethylcylcohexane, di-t-butyl peroxide, dicumyl peroxide, 2,5-dimethyl-2,5-bis(t-butyperoxy)hexane and 2,5-dimethyl-2,5-bis(t-butylperoxy)hexyne-3 are preferred.

A crosslinking initiator (D) mentioned above is used in an amount of 0.02 to 3 parts by weight, preferably 0.05 to 1 part by weight, per 100 parts by weight of the composition consisting of (A) and (B). When the amount of (D) is less than 0.02 part by weight, crosslinking is insufficient. Also, use of (D) in excess of 3 parts by weight is unrecommendable as it provides no additional improvement of the properties of the composition.

Mono- and polyfunctional monomers can be used as the crosslinking assistant (E). The monofunctional monomers are preferably radical polymerizable vinyl type monomers such as aromatic vinyl monomers, unsaturated nitrile monomers such as acrylonitrile and methacrylonitrile, acrylic ester monomers, methacrylic ester monomers, acrylic acid monomers, methacrylic acid monomers, maleic anhydride monomers, and N-substituted maleimide monomers. The polyfunctional monomers include divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinonedioxime, p,p'-dibenzoylquinonedioxime, phenylmaleimide, allyl methacrylate, N,N'-m-phenylenebismaleimide, diallyl phthalate, tetraallyloxyethane, and 1,2-polybutadiene. These crosslinking assistants may be used in proper combinations.

A crosslinking assistant(s) (E) mentioned above is used in an amount of 0.1 to 5 parts by weight, preferably 0.5 to 2 parts by weight, per 100 parts by weight of the composition consisting of (A) and (B). When the amount of (E) is less than 0.1 part by weight, crosslinking of the composition may be unsatisfactory. Also, use of (E) in excess of 5 parts by weight is undesirable as it provides no further improvement of the properties of the composition but rather superfluous crosslinking assistant may remain in the composition.

The composition of the present invention may also contain other types of resins and elastomers within limits not prejudiciary to the features of the composition.

The composition of the present invention may further contain an inorganic filler and a plasticizer in such an amount that wound not give any adverse effect to the features of the composition. The inorganic fillers usable here include calcium carbonate, magnesium carbonate, silica, carbon black, glass fiber, titanium oxide, clay, mica, talc, magnesium hydroxide, aluminum hydroxide and the like. As the plasticizer, phthalic esters such as polyethylene glycol and dioctyl phthalate (DOP) and the like can be used. Other additives such as organic or inorganic pigment, thermal stabilizer, anti-oxidant, ultraviolet absorber, light stabilizer, flame retardant, silicon oil, anti-blocking agent, foaming agent, antistatic agent, antibacterial agent, etc., can be used properly.

For producing the composition of the present invention, it is possible to employ the conventional methods using ordinary means such as Banburyl mixer, kneader, single-screw extruder, double-screw extruder, etc., which are generally used in the production of resin and rubber compositions. A double-screw extruder is preferably used for efficient effectuation of dynamic crosslinking in the present invention. This double-screw extruder is better suited for continuously producing the composition of the present invention as it is capable of uniformly and finely dispersing an olefinic elastomer and a propylene type resin and inducing a crosslinking reaction with the addition of other components.

In the present invention, (A) and (B) are preferably in a finely divided form such as pellet, powder or crumb.

The composition of the present invention can be produced, for instance, through the following steps. (A) and (B) are mixed well and supplied to the hopper of an extruder. Both (A) and (B) may be added from the start or may be added halfway in the operation by the extruder. (C) may be added halfway in the operation by the extruder or may be added in portions, with one portion being added at the start and the other portion being added halfway in the operation. Part of (A) and (B) may be added halfway in the operation by the extruder. The supplied materials are melted by heating and kneaded in the extruder, whereby (A) and said crosslinking initiator and crosslinking assistant undergo a crosslinking reaction. Then (C) is added and the mixture is melted and kneaded to effectuate the crosslinking reaction, mixing and dispersion sufficiently, and then the produced composition is withdrawn from the extruder and pelletized to obtain pellets of the composition of the present invention.

In the present invention, the degree of crosslinking and the degree of swelling of (A) are defined as follows. The composition of a weight $W_0$ is refluxed in 200 ml of orthodichlorobenzene for 20 hours, then the solution is filtered and the weight ($W_1$) of the swollen composition is measured. Then the swollen composition is dried in vacuo at 100° C. and its weight ($W_2$) is again measured. The degree of crosslinking and the degree of swelling are given by the following equations:

Degree of crosslinking=$(W_2/W_0)\times 100$ (%)

Degree of swelling=$W_1/W_2$

Both the degree of crosslinking and the degree of swelling can be controlled by the proper selection and adjustment of the type and amount of the crosslinking initiator and crosslinking assistant, reaction temperature, reaction system, way of addition of the softening agent, etc.

For instance, the degree of crosslinking can be raised by incrementing the crosslinking initiator or the crosslinking assistant and conducting the reaction for a prolonged period of time at a temperature as low as possible but not lower than the decomposition temperature of the crosslinking initiator. Also, the degree of swelling can be raised by controlling the reaction rate by using a polyfunctional crosslinking assistant with few functional groups or a polymerizable vinyl monomer. Rise of the degree of crosslinking and the degree of swelling can be also effectuated by such means as reduction of the amount of the crosslinking initiator, use of a bifunctional, instead of trifunctional, crosslinking assistant, use of a vinyl type monomer such as methacrylic ester monomer or aromatic vinyl monomer, and prosecution of the reaction at a low temperature. It should be noted, however, that excessive addition of the crosslinking initiator and crosslinking assistant, though elevating the degree of crosslinking, causes a reduction of the degree of swelling, making it unable to meet the requirements of the present invention. Also, use of a crosslinking initiator and crosslinking assistant with excessively high activity or high temperature conditions, though elevating the degree of crosslinking, reduces the degree of swelling and does not satisfy the requirements of the present invention.

On the other hand, when the crosslinking initiator and crosslinking assistant are blended with (A) in which a small amount of (C) has been absorbed beforehand, it is possible to raise the degree of crosslinking while inhibiting the drop of the degree of swelling since the crosslinking reaction proceeds gently.

In the present invention, in order to attain the desired degree of crosslinking and swelling, as a specific production manner regarding the reaction scheme, it is important that the degree of mixing M given by the following equation is in a range of $10\times 10^6 \leq M \leq 1{,}000\times 10^6$:

Degree of mixing $M=(\pi^2/2)(L/D)D^3(N/Q)$ wherein L is extruder length (mm) in the die direction with the material supply section as datum point;
D is inner diameter (mm) of extruder barrel;
Q is discharge rate (kg/h); and
N is screw rotation speed (rpm).

When M is less than $10\times 10^6$, dynamic crosslinking at a desired rate does not take place, with the degree of crosslinking less than 50%, resulting in a low mechanical strength of the composition. On the other hand, when M exceeds $1{,}000\times 10^6$, the degree of crosslinking also fails to reach 50% due to excessive shearing force, making the composition low in mechanical strength.

In the present invention, as means for attaining the desired degree of crosslinking and swelling in connection with reaction temperature, it is recommended to carry out melting and mixing under the melting temperature conditions which satisfy the following requirements:

$T_1-100<T_2<T_1+40$ $T_2+1<T_3<T_2+200$ wherein $T_1$ is the one-minute half-life temperature (° C.) of the crosslinking initiator (D). That is, melting and mixing is carried out first at a temperature $T_2$ (° C.) and then at a temperature $T_3$ (° C.). Especially in a melt extruder having a length L in the die direction with the material feed opening as datum point, the extruder zone with a length of 0.1L to 0.5L from the material feed opening is set at the temperature $T_2$ (° C.) and melting and mixing is carried out at this temperature. After this operation, the extruder zone is now set at the temperature $T_3$ (° C.) and melting and mixing is further continued. Here, it is especially desirable that $T_1$ is 150 to 250° C., and $T_1$ or $T_2$ at each zone of the melt extruder may be a uniform temperature or may have a temperature gradient.

In the present invention, as an important and preferable technique relating to the method of adding a softening agent (C) for attaining the desired degrees of crosslinking and swelling, there is used an extruder having one main feed section and plural feed sections capable of side feed, these sections being positioned at different distances from the extruder end, and when (A), (B) and (C) are melted and mixed for effecting dynamic crosslinking, (C) is fed dividedly to the plural feed sections. Here, it is important that (C) be portioned out to the respective plural feed sections. Such divided feed of (C) contributes to lowering the melt viscosity during dynamic crosslinking at the fore stage of the extruder, which controls the reaction rate and elevates the degree of swelling.

The degree of swelling can be controlled by increasing or decreasing the division frequency and the feed of (C).

The olefinic rubber composition obtained in the manner described above can be molded into various articles by any conventional molding methods. As preferable molding methods, injection molding, extrusion molding, compression molding, blow molding, calender molding and foam molding are employed.

The present invention will be described in further detail with reference to the Examples and Comparative Examples, but the present invention should not be limited to these Examples. The test methods used for the evaluation of various properties in the following Examples and Comparative Examples are described below.

(1) Degree of Crosslinking and Degree of Swelling

The composition of a weighed ($W_0$) is refluxed in 200 ml of orthodichlorobenzene for 20 hours, then the solution is filtered and the weight ($W_1$) of the swollen composition is measured. Then the swollen composition is dried in vacuo at 100° C. and its weight ($W_2$) is again measured. The degree of crosslinking and the degree of swelling are given by the following equations.

Degree of crosslinking=$(W_2/W_0) \times 100$ (%)

Degree of swelling=$W_1/W_2$ (2) Surface Hardness

Four 2-mm-thick sheets were placed one over another, and surface hardness of the stuck was measured according to ASTM D2240, Type A, in a 23° C. atmosphere.

(3) Tensile Strength at Break [kgf/cm$^2$]

Determined according to JIS K6251 at 23° C.

(4) Tensile Elongation at Break [%]

Determined according to JIS K6251 at 23° C.

(5) Light Stability

Determined by a method based on JIS K7102 using ATLAS CI35W Weatherometer mfd. by Atlas Electric Devices Co., U.S.A as a light stability tester. The test sheet was irradiated with xenon light (wavelength: 340 nm; energy: 0.30 W/m$^2$) for 300 hours under the conditions of a tester inside temperature of 55° C., a humidity of 55% and no rain.

After irradiation, appearance of the sheet was visually observed and evaluated according to the following rating.

⊚: Excellent

○: Good

Δ: Good, but rather rough to the touch.

X: Generally rough to the touch and glossless.

(6) Heat Stability

The sheet was heated in a Geer oven at 120° C. for 100 hours, and the ratio of the value of tensile strength at break (measured according to JIS K6251) after the heat test to the initial value thereof was defined as retention (%) of tensile strength at break and used as a measure of heat stability.

(7) Bleed Resistance

The molded article was left in an atmosphere of 120° C. for 100 hours and then the surface of the article was visually observed and evaluated.

⊚: Excellent

○: Good

Δ: Oily substance adhered slightly on the surface of the article

X: Oily substance adhered heavily on the surface of the article, making it very tacky.

(8) Appearance

The article surface was visually observed and evaluated.

⊚: Excellent

○: Good

Δ: Oily substance adhered slightly on the surface of the article x: Oily substance adhered heavily on the surface of the article, making it very tacky.

The following materials were used as components in the Examples and Comparative Examples.

(i) Ethylene-α-olefin copolymers

1) Ethylene-octene-1 copolymer (EOM-1)

Produced by a method using a metallocene catalyst described in JP-A-3-163088. The ethylene/octene-1 ratio of the copolymer is 72/28 by weight. (This copolymer is called EOM-1).

2) Ethylene-Octene-1 Copolymer (EOM-2)

Produced by a method using an ordinary Ziegler catalyst. The ethylene/octene-1 ratio of the copolymer is 72/28 by weight. (This copolymer is called EOM-2).

3) Ethylene/propylene/dicyclopentadiene copolymer (EPDM-1)

Produced by a method using a metallocene catalyst described in JP-A-3-163088. The ethylene/propylene/dicyclopentadiene of the copolymer is 72/24/4 by weight. (This copolymer is called EPDM-1).

4) Ethylene/propylene/dicyclopentadiene copolymer (EPDM-2)

Produced by a method using an ordinary Ziegler catalyst. The ethylene/propylene/dicyclopentadiene of the copolymer is 72/24/4 by weight. (This copolymer is called EPDM-2).

(ii) Olefinic Resin

Polypropylene, an isotactic polypropylene (called PP) produced by Nippon Polychem Co., Ltd.

(iii) Paraffinic Oil

DIANA Process Oil PW-380 (called MO) produced by Idemitsu Kosan Co., Ltd.

(iv) Crosslinking Initiators 1) 2,5-dimethyl-2,5-bis(t-butylperoxy)hexane (trade name: PERHEXA 25B (called POX-1) produced by NOF CORPORATION.
2) 2,5-dimethyl-2,5-bis(t-butylperoxy)hexyne-3 (trade name: PERHEXYNE 25B (called POX-2) produced by NOF CORPORATION.

(v) Crosslinking Assistants

1) Divinylbenzene (called DVB) produced by Wako Pure Chemicals Co., Ltd.
2) Triallyl isocyanurate (called TAIC) produced by Nippon Kasei KK
3) N,N'-m-phenylenebismaleimide (called PMI) produced by Ouchi Shinko Kagaku KK
4) Methyl methacrylate (called MMA) produced by Asahi Chemical Industries Co., Ltd.
5) Styrene (called ST) produced by Asahi Chemical Industries Co., Ltd.

EXAMPLES 1-8 AND COMPARATIVE EXAMPLES 1-4

A double-screw extruder (40 mm$\phi$, L/D=47) having a feed opening at the middle of the barrel, and a double-flighted screw having the mixing sections in front and in the rear of the feed opening were used.

A mixture of component (A)/PP/POX-1/DVB/MO=65/35/0.5/1.0/45 (parts by weight) was introduced, excepting MO, into the double-screw extruder, then MO was introduced into the extruder from the feed opening at the middle of the extruder with a pump, and the mixture was melt extruded under the following conditions: melt extrusion temperature=220° C.; discharge rate Q=12 kg/h; extruder barrel inner diameter D=25 mm; L/D (L: extruder length (mm))=47; screw rotation speed N=280 rpm.

The degree of crosslinking and the degree of swelling were controlled by properly selecting and adjusting the type and amount of the crosslinking initiator and crosslinking assistant, reaction temperature and reaction system, based on the above conditions. More specifically, for elevating the degree of crosslinking, feed of the crosslinking initiator or the crosslinking assistant was increased and the reaction was conducted for a prolonged period of time at a temperature which was as low as possible but not lower than the decomposition temperature of the radical initiator. On the other hand, for raising the degree of swelling, for which it is essential to hold down the reaction rate, there were used such techniques as reducing the feed of the crosslinking initiator and carrying out the reaction at a low temperature. The degree of crosslinking was elevated while checking the reduction of the degree of swelling by blending POX and DVB with (A) in which a small amount of MO had previously been absorbed.

The thus obtained rubber compositions were compression molded into 2 mm-thick sheets at 200° C. and their mechanical properties were evaluated. The results are shown in Table 1.

TABLE 1

| | | Comp. Example 1 | Example 1 | Comp. Example 2 | Comp. Example 3 | Example 2 | Example 3 | Example 4 |
|---|---|---|---|---|---|---|---|---|
| Rubber characteristics | Rubber type | | | | EOM-1 | | | |
| | Degree of crosslinking % | 45 | 50 | 75 | 74 | 74 | 73 | 74 |
| | Degree of swelling | 15 | 16 | 3 | 5 | 15 | 20 | 30 |
| Physical properties | Hardness | 68 | 69 | 69 | 71 | 70 | 70 | 71 |
| | Tensile strength at break kgf/cm$^2$ | 50 | 71 | 70 | 80 | 130 | 121 | 85 |
| | Tensile elongation at break % | 120 | 390 | 300 | 340 | 520 | 490 | 440 |

| | | Example 5 | Comp. Example 4 | Example 6 | Example 7 | Example 8 |
|---|---|---|---|---|---|---|
| Rubber characteristics | Rubber type | EOM-1 | | | EOM-2 | EPDM-1 | EPDM-2 |
| | Degree of crosslinking % | 75 | 76 | 75 | 76 | 75 |
| | Degree of swelling | 40 | 42 | 14 | 15 | 16 |
| Physical properties | Hardness | 69 | 69 | 70 | 71 | 70 |
| | Tensile strength at break kgf/cm$^2$ | 80 | 45 | 81 | 63 | 60 |
| | Tensile elongation at break % | 400 | 280 | 400 | 380 | 350 |

It is seen from Table 1 that the compositions satisfying the requirements for providing the desired degree of crosslinking and the desired degree of swelling according to the present invention excel in mechanical strength such as tensile strength at break and tensile elongation at break. It is also noted that the ethylene-α-olefin copolymers composed of ethylene and $C_3$-$C_{20}$ α-olefins produced by using a metallocene catalyst, especially an ethylene-octene-1 copolymer produced by using a metallocene type catalyst can realize outstanding mechanical strength.

EXAMPLES 9-11 AND COMPARATIVE EXAMPLES 5-7

The procedure of Example 2 was repeated except that the degree of mixing M was changed as defined below. The results are shown in Table 2.

$$M=(\pi^2/2)(L/D)D^3(N/Q)$$

L: extruder length (mm) in the die direction with the material feed opening as datum point;
D: inner diameter (mm) of the extruder barrel;
Q: discharge rate (kg/h);
N: screw rotation speed (rpm);
D=25 mm, L/D=47

TABLE 2

| | Examples | | | Comp. Examples | | |
|---|---|---|---|---|---|---|
| | 9 | 10 | 11 | 5 | 6 | 7 |
| Production conditions | | | | | | |
| N | 300 | 300 | 2750 | 300 | 300 | 2800 |
| Q | 10 | 100 | 10 | 120 | 300 | 10 |
| M (× $10^6$) | 109 | 11 | 997 | 9 | 4 | 1015 |
| Degree of crosslinking (%) | 75 | 69 | 59 | 52 | 43 | 48 |
| Degree of swelling | 16 | 20 | 8 | 42 | 38 | 3 |
| Hardness | 71 | 68 | 73 | 63 | 50 | 78 |
| Tensile strength at break (kgf/cm²) | 128 | 105 | 130 | 56 | 48 | 61 |
| Tensile elongation at break (%) | 510 | 400 | 515 | 210 | 320 | 120 |

It is seen from Table 2 that the degree of crosslinking and the degree of swelling satisfying the requirements in the present invention are provided by carrying out the production with the degree of mixing M in a range of $10\times10^6 \leq M \leq 1,000\times10^6$.

EXAMPLES 12-23 AND COMPARATIVE EXAMPLES 8-9

The procedure of Example 2 was repeated except that melting and mixing was carried out first at a temperature $T_2$ (° C.) and then at a temperature $T_3$ (° C.) as specified below. The results are shown in Tables 3 and 4.

TABLE 3

| | Examples | | | | | | Comp. Examples | |
|---|---|---|---|---|---|---|---|---|
| | 12 | 13 | 14 | 15 | 16 | 17 | 8 | 9 |
| (D) Type | POX-1 | POX-1 | POX-1 | POX-1 | POX-1 | POX-2 | POX-1 | POX-1 |
| $T_1$ | 180 | 180 | 180 | 180 | 180 | 194 | 180 | 180 |
| $T_2$ | 150 | 85 | 215 | 150 | 150 | 150 | 80 | 150 |
| $T_3$ | 220 | 220 | 220 | 155 | 345 | 220 | 220 | 350 |
| (E) | | | | DVB | | | | |
| Degree of crosslinking (%) | 73 | 85 | 65 | 93 | 83 | 79 | 45 | 51 |
| Degree of swelling | 14 | 19 | 12 | 15 | 8 | 12 | 42 | 3 |
| Hardness | 72 | 76 | 69 | 78 | 73 | 73 | 63 | 65 |
| Tensile strength at break (kgf/cm²) | 135 | 155 | 125 | 160 | 135 | 140 | 43 | 65 |
| Tensile elongation at break (%) | 550 | 530 | 600 | 680 | 490 | 590 | 80 | 110 |

In the case of POX-1, $T_1 = 180$  $80 < T_2 < 220$  $T_2 + 1 < T_3 < T_2 + 200$
In the case of POX-2, $T_1 = 190$  $94 < T_2 < 234$  $T_2 + 1 < T_3 < T_2 + 200$ It is seen from Table 3 that the degree of crosslinking and the degree of swelling satisfying the requirements in the present invention can be attained by carrying out the production under the following melting temperature conditions:

$T_1$: one-minute half-life temperature (° C.) of (C)

$$T_1-100<T_2<T_1+40$$

$$T_2+1<T_3<T_2+200$$

TABLE 4

| | Examples | | | | | |
|---|---|---|---|---|---|---|
| | 18 | 19 | 20 | 21 | 22 | 23 |
| (E) | DVB | TAIC | PMI | MMA | TAIC/MMA 1/1 | DVB/ST 1/1 |
| Degree of crosslinking (%) | 74 | 91 | 80 | 50 | 86 | 70 |
| Degree of swelling | 13 | 10 | 12 | 40 | 15 | 19 |
| Bleed resistance | ○ | ◎ | ○ | △ | ◎ | ◎ |
| Appearance | ○ | ○ | ○ | ◎ | ◎ | ◎ |
| Hardness | 71 | 77 | 72 | 63 | 75 | 69 |
| Tensile strength at break (kgf/cm²) | 130 | 155 | 125 | 100 | 145 | 110 |

TABLE 4-continued

| | Examples | | | | | |
|---|---|---|---|---|---|---|
| | 18 | 19 | 20 | 21 | 22 | 23 |
| Tensile elongation at break (%) | 500 | 450 | 480 | 600 | 590 | 600 |

Table 4 shows that use of trifunctional TAIC, as compared with use of bifunctional DVB or PMI, more increases the density of crosslinking, hence lowers the degree of swelling and elevates retention of the softening agent to improve bleed resistance.

It is also noted that although trifunctional TAIC slightly degrades the appearance of the product, its use in combination with monofunctional monomer MMA improves the balance of appearance and bleed resistance.

EXAMPLES 24-26

The procedure of Example 2 was repeated except that the feed of 45 parts by weight of MO was divided at the rate shown in Table 5. The results are shown in Table 5.

TABLE 5

| | Examples | | |
|---|---|---|---|
| | 24 | 25 | 26 |
| Division rate of (C) fore stage/rear stage | 15/30 | 0/45 | 45/0 |
| Degree of crosslinking | 76 | 74 | 56 |
| Degree of swelling | 20 | 15 | 17 |
| Hardness | 71 | 69 | 70 |
| Tensile strength at break (kgf/cm$^2$) | 131 | 91 | 78 |
| Tensile elongation at break (%) | 520 | 450 | 400 |

It is seen from Table 5 that when the feed of MO is portioned out, the melt viscosity during dynamic crosslinking at the fore stage of the extruder lowers down to suppress the reaction rate, and consequently the degree of swelling is elevated while maintaining the degree of crosslinking.

INDUSTRIAL APPLICABILITY

Having high mechanical strength, heat resistance and oil resistance, the olefinic rubber composition of the present invention finds its use for many applications, such as automobile parts, interior automotive trim, air bag cover, machinery parts, electric appliance parts, cables, hoses, belts, toys, miscellaneous goods, articles for daily use, building materials, sheets, films, etc., and greatly contributes to the industrial world.

The invention claimed is:

1. A process for producing a thermoplastic olefinic rubber composition comprising (A) 1 to 99 parts by weight of an ethylene-α-olefin copolymer having ethylene units and $C_3$-$C_{20}$ α-olefin units, and (B) 1 to 99 parts by weight of a thermoplastic olefinic resin, the total amount of (A) and (B) being 100 parts by weight, said (A) having a degree of crosslinking of 50% or more and a degree of swelling of 5 to 40, wherein said thermoplastic olefinic resin (B) is selected from the group consisting of polyethylenes, isotactic homopolypropylenes and isotactic (block and random) copolymers of propylene and other α-olefin selected from the group consisting of ethylene, butane-1, pentene-1 and hexane-1; the process comprising the steps of using a radical initiator (D) having a one-minute half-life temperature $T_1$ of 100 to 250° C. in an amount of 0.02 to 3 parts by weight based on 100 parts by weight of total amount of (A) and (B), setting an extruder zone with a length of 0.1L to 0.5L at a melting temperature $T_2$ and an extruder zone with a length of 0.5L to 1.0L at a melting temperature $T_3$, wherein L is extruder length in die direction with material supply section as datum point, so as to satisfy the following requirements;

$T_1-100<T_2<T_1+40$ $T_2+1<T_3<T_2+200$ and controlling degree of mixing M defined as $M=(\pi^2/2)(L/D)D^3(N/Q)$ in a range of $10\times10^6 \leq M \leq 1{,}000\times10^6$ wherein L is extruder length (mm), D is inner diameter (mm) of extruder barrel, Q is discharge rate (kg/h) and N is screw rotation speed (rpm).

2. The process according to claim 1, wherein said (A) is an ethylene-α-olefin copolymer having ethylene units and $C_3$-$C_{20}$ α-olefin units which is produced by using a metallocene catalyst.

3. The process according to claim 1, wherein said degree of swelling is 10 to 40.

4. The process according to claim 1, wherein the thermoplastic olefinic rubber composition further comprises 5 to 500 parts by weight of a softening agent (C).

5. The process according to claim 1, wherein the thermoplastic olefinic rubber composition is crosslinked by said radical initiator (D), or said radical initiator (D) and a crosslinking assistant (E).

6. The process according to claim 5, wherein said crosslinking assistant (E) comprises a polyfunctional monomer and a monofunctional monomer.

7. The process according to claim 1, wherein said thermoplastic olefinic resin (B) has a melt index within a range of 0.1 to 100 g/10 min when measured at 230° C. under a load of 2.16 kg.

8. The process according to claim 1, wherein said radical initiator (D) is an organic peroxide.

9. The process according to claim 1, wherein said radical initiator (D) is utilized in combination with a crosslinking assistant (E) that is present in an amount of 0.1 to 5 parts by weight, per 100 parts by weight of (A) and (B).

* * * * *